Aug. 26, 1924.
T. L. RUTH
1,506,449
PUNCTUREPROOF AUTOMOBILE WHEEL
Filed Aug. 1, 1921
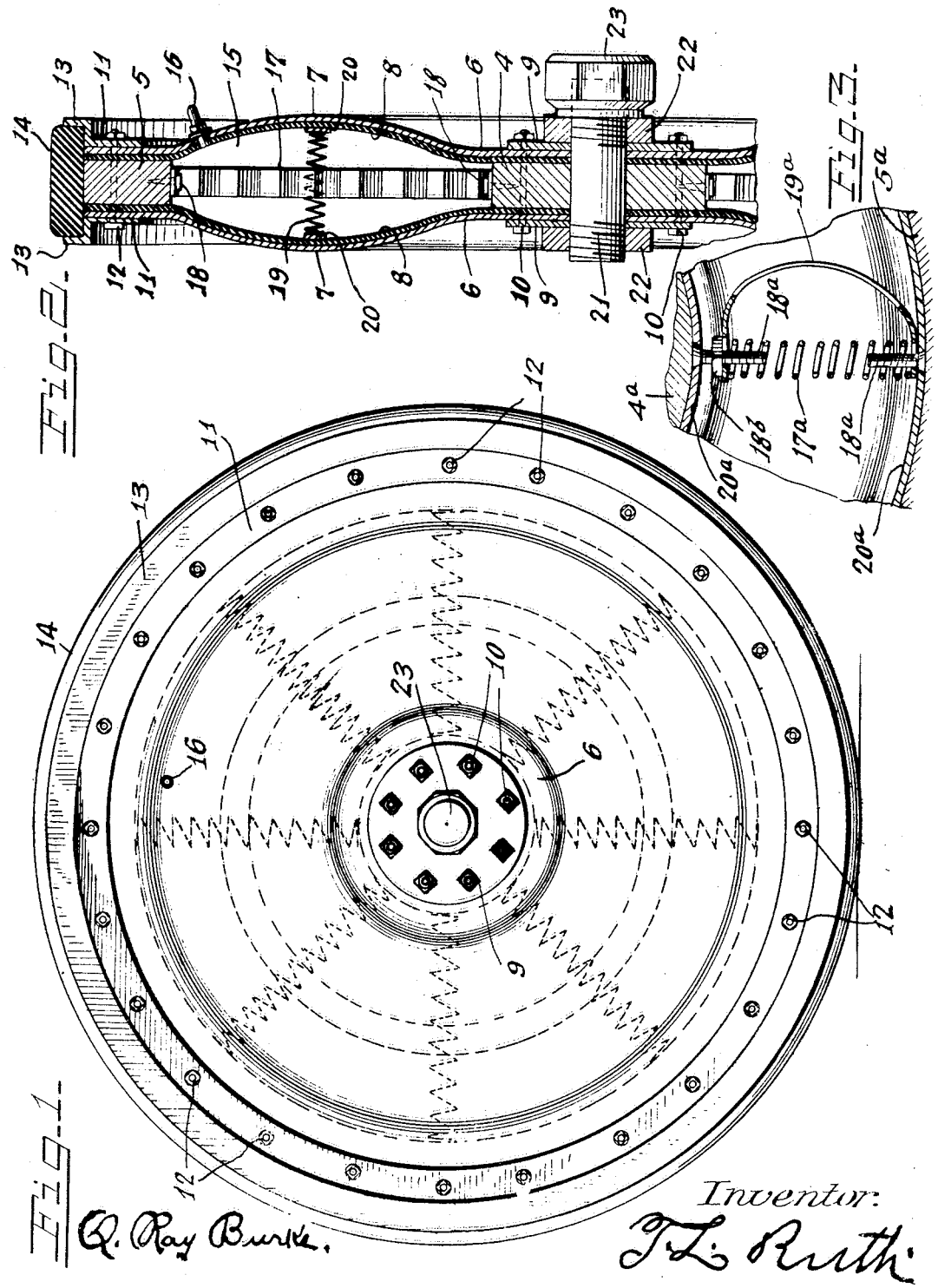

Patented Aug. 26, 1924.

1,506,449

UNITED STATES PATENT OFFICE.

THOMAS LABANIAN RUTH, OF WILMINGTON, NORTH CAROLINA.

PUNCTUREPROOF AUTOMOBILE WHEEL.

Application filed August 1, 1921. Serial No. 489,114.

*To all whom it may concern:*

Be it known that I, THOMAS LABANIAN RUTH, a citizen of the United States, residing at 1311 South Fourth Street, in the city of Wilmington, in the county of New Hanover and State of North Carolina, have invented a new Punctureproof Automobile Wheel, of which the following is a specification.

The present invention relates to improvements in vehicle wheels, and the object is to provide a combination spring and air-cushioned wheel of novel construction.

In the accompanying drawings:—

Figure 1 is a side elevation of the preferred embodiment of the invention,

Figure 2 is a radial cross sectional view therethrough,

Figure 3 is a detail longitudinal section of a modified form of construction.

In the embodiment disclosed, a hub member 4 is employed, surrounded by a rim or felly member in the form of a ring 5 located concentrically and in spaced relation to the hub member. The members 4 and 5 may be of any suitable material and located on opposite sides of the same are spring metal disks 6 which may be made of one or more plies and of different gauges, depending on the load the wheel must support. These disks are outwardly bowed, as shown at 7, between the hub member 4 and rim or felly member 5. Located against their inner sides are disks 8 of air tight material, such as rubber or rubberized fabric, these disks lying against the opposite faces of the members 4 and 5 and thus being interposed between said members and the wheel disks 6. Clamping plates 9, located outside the central portions of the disks in line with the hub member and connected by bolts 10 passing through these various parts, serve to secure the central portions of the disks to the hub member. Flanged rim rings 11, bearing against the peripheral margins of the disks are held in place by transverse bolts 12 that pass through said peripheral portions and through the rim member 5. The flanges 13 of the rings 11 project beyond the rim member and with the same form an annular groove for the reception of a suitable tire 14. As a consequence of the construction it will be evident that an annular enclosed fluid-holding chamber 15 is provided between the hub and rim members 4 and 5, and suitable fluid as air under pressure can be introduced thereinto by a pump applied to the usual valved nipple, designated 16.

In the chamber 15 are located a plurality of radial supporting springs 17 having their ends seated on the hub member 4 and the rim member 5. These springs may take any desired form. For example, they are shown in Figures 1 and 2 as being of zigzag resilient material, their ends being fastened in place by suitable devices 18. Transverse springs 19 are located in the air chamber 15 and are connected to rings 20 located at the outwardly bowed portions of the disks 6—8. The hub member 4 and the disks 6 and 8 are provided with alined openings through which is passed a tubular hub box 21, the ends of which project beyond the clamping plates 9 and have threaded thereon holding nuts 22. These nuts and hub box serve as additional clamping means for securing the disks to the hub member 4. A dust cap 23 is shown as applied to the outer end of the box 20.

The structure is obviously a relatively simple one and the disks 7 and springs 17 and 19 serve to yieldingly resist and permit a relative play between the hub and rim. Moreover the springs are all located in the single annular chamber 15.

In Figure 3 is shown a modified form of construction in which the hub member is designated $4^a$ and a ring member $5^a$. Interposed between the same are coiled springs, one of which is shown at $17^a$. Associated with each coiled spring is a bowed spring $19^a$ located in the plane of the wheel. The ends of the coiled spring $17^a$ and bowed spring $19^a$ are located on inwardly projecting bolts $18^a$, and on one of said bolts is an adjusting nut $18^b$, which bearing against the adjacent ends of the springs $17^a$ and $19^a$, serves as a means for varying the tension of the springs. These bolts $18^a$ are carried by metallic lining strips $20^a$.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:—

1. A resilient wheel comprising a hub member and a rim member surrounding the same, an airtight flexible casing extending from the hub member to the rim member and forming a single annular chamber for holding fluid under pressure, and a plurality of substantially radial springs extending from the hub member to the rim member and located directly in said chamber.

2. A resilient wheel comprising a hub member and a rim member surrounding the same, outwardly convexed spaced air tight side walls connecting the hub member and rim member and forming between them a single annular chamber for holding fluid under pressure, a plurality of substantially radial springs extending from the hub member to the rim member and located directly in said chamber, and transverse springs connecting the convexed portions of the side walls.

3. A resilient wheel comprising a hub member and a rim member surrounding the same, flexible metallic disks and airtight fabric disks behind the same and located against the opposite sides of the hub and rim members, a hub box extending through the hub member and having holding means thereon that clamp the central portions of said disks, outwardly flanged clamping rings secured to the opposite sides of the rim member and clamping the peripheral portions of the disks thereto, the flanges of said rings projecting beyond the rim member and a tire located between the said projecting flanges.

4. A resilient wheel comprising a hub member and a rim member surrounding the same, flexible metallic disks and air tight fabric disks behind the same and located against the opposite sides of the hub and rim members, forming a single annular chamber for the reception of fluid, substantially radial springs in the chamber between the hub member and the rim member, transverse springs in the chamber between said disks, a hub box extending through the hub member and having holding means thereon that clamp the central portions of said disks, outwardly flanged clamping rings secured to the opposite sides of the rim member and clamping the peripheral portions of the disks thereto, the flanges of said rings projecting beyond the rim member, and a tire located between the said projecting flanges.

T. L. RUTH.

Witness:
BESSIE I. BRINSON.